UNITED STATES PATENT OFFICE.

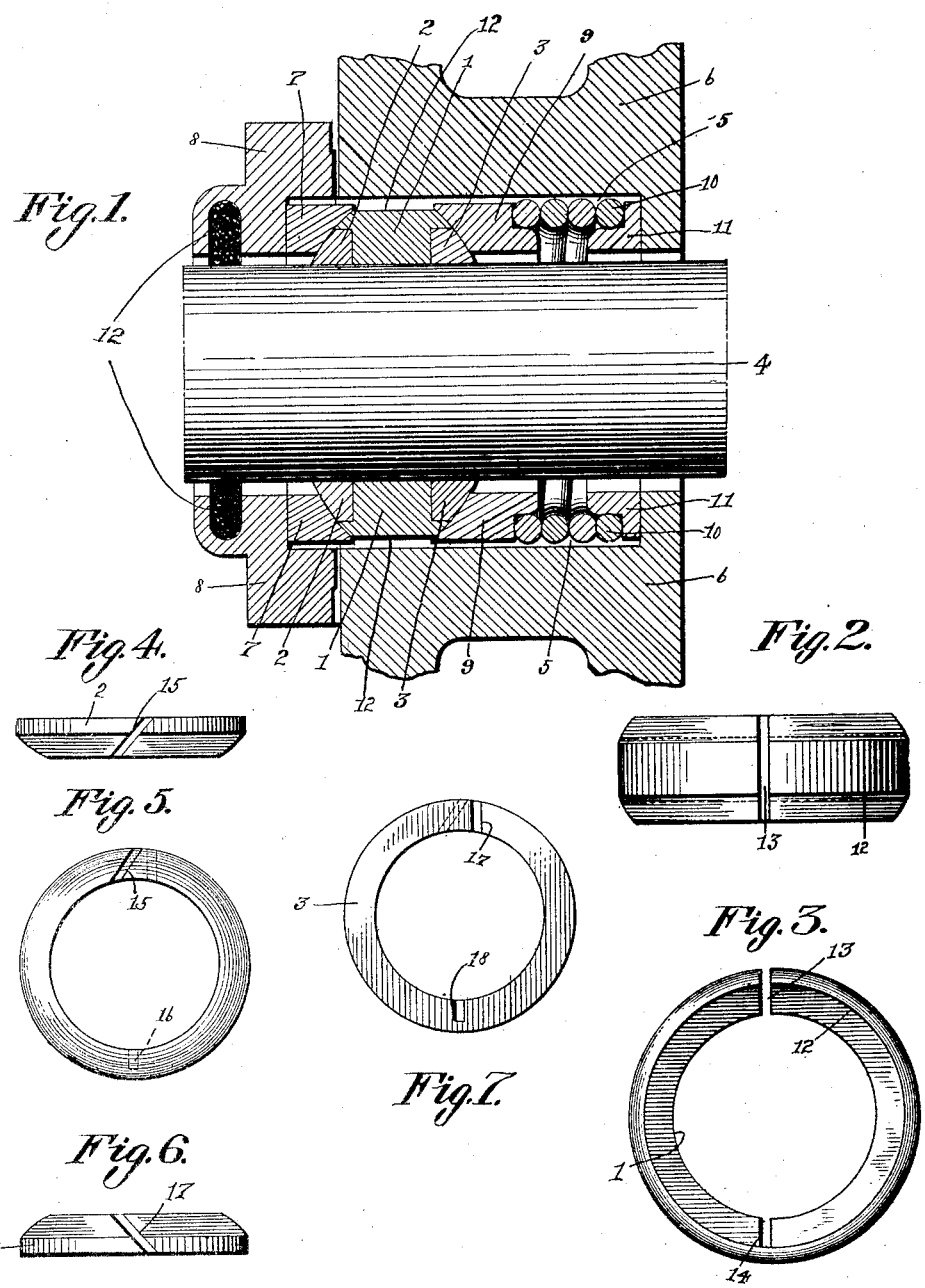

WILLIAM CHRIST DRUM, OF PORTLAND, OREGON, ASSIGNOR OF ONE-HALF TO WILLIAM JAMES COLLINS, OF PORTLAND, OREGON.

PISTON-ROD PACKING.

1,329,829.     Specification of Letters Patent.     Patented Feb. 3, 1920.

Application filed August 22, 1919. Serial No. 319,196.

*To all whom it may concern:*

Be it known that I, WILLIAM CHRIST DRUM, a citizen of the United States, and a resident of Portland, in the county of Multnomah and State of Oregon, have invented certain new and useful Improvements in Piston-Rod Packings, of which the following is a specification.

My invention is an improvement in piston rod packings, and has for its object to provide a packing of the character specified of simple and inexpensive construction, easily applied to existing piston rods, and without material change therein, and which will provide a fluid-tight joint.

In the drawings:

Figure 1 is a vertical section through the packing in place;

Fig. 2 is a plan view, with the packing removed;

Fig. 3 is a side view;

Fig. 4 is an edge view of one of the lateral sections;

Fig. 5 is a side view;

Fig. 6 is an edge view of the other lateral section; and

Fig. 7 is a side view.

The improved ring, which is composed of a central section 1 and two lateral sections 2 and 3, is shown in connection with the piston rod 4 of a steam engine, and a stuffing box arranged in a recess 5 in the cylinder wall 6.

The improved ring is held tightly on the rod, so that no steam may escape between the rod and the ring, and it is held at each face, so that it cannot move with the piston. In cross section the ring as a whole has beveled corners, the peripheral surface being straight while the side faces incline inwardly toward the peripheral surface.

The outermost of these inclined side walls is engaged by the beveled face of a ring or washer 7 which is held from outward movement by a cage 8. The innermost inclined side wall of the ring is engaged by the inclined face of a second ring or washer 9, arranged within the recess 5.

The ring or washer 9 is normally pressed outwardly toward the ring 1—2—3 by means of a spring 10, arranged between the washer 9 and a brass bearing 11 at the bottom of this recess. Referring to Fig. 1, it will be noticed that the washer 9 and the bearing ring are rabbeted for engagement by the ends of the spring.

The washers 7 and 9 and bearing ring 11 and cage 8 are of greater internal diameter than the external diameter of the piston rod, as shown, so that the rod does not touch any of these parts, and the cage carries a ring 12 of packing which contacts with the periphery of the rod. The packing is held in an annular recess in the case.

The section 1 of the ring is counterbored at each end, as shown at 12, to receive the sections 2 and 3 and all of the sections are split rings. Referring to Figs. 2 and 3, it will be seen that the section 1 is cut entirely through at one end, as indicated at 13, and partly through the other side, as indicated at 14, in a plane diametrical to the ring.

The split 14 extends from the interior of the section to the outer walls of the rabbets 12, as shown in Fig. 3, thus imparting to the section considerable resilience. The sections 2 and 3 are also split, and these sections are alike with the exception of the splits, which are symmetrical in the two sections.

The section 2, as shown in Figs. 4 and 5, is split entirely through one side, as indicated at 15, and partly through the other, as indicated at 15. The split 15 is inclined with respect to the axis of the section, so that the ends of the section at the split overlap. The splits 17 and 18 of the section 3 are like those of the section 2, except that the split 17 is inclined in the opposite direction to the split 15.

In use, the entire ring, consisting of the three sections, is arranged as shown in Fig. 1, and with the splits of the three sections staggered, or breaking joint with the splits of the other sections. Thus a fluid-tight joint is provided, from which no pressure may escape.

I claim:

In combination with the piston rod and the stuffing box, of a packing ring adapted to be fitted upon the rod and consisting of a central and lateral sections, the central section having its ends counterbored to receive the lateral sections and the ends of the ring as a whole being beveled, and coöperating rings internally beveled at their ends to coöperate with the beveled ends of the packing ring, said last named rings being of greater internal diameter than the packing ring, and means for pressing said last named rings yieldingly toward each other to force the sections of the packing ring together and to clamp them on the piston rod, the sections of the packing ring being cut through at one side and partially through at the opposite side to permit them to be sprung upon the rod.

WILLIAM CHRIST DRUM.